United States Patent [19]
Hites

[11] 4,086,382
[45] Apr. 25, 1978

[54] METHOD OF PRODUCING FIRE RESISTANT WOOD PRODUCTS AND PRODUCT THEREOF

[75] Inventor: Clifford C. Hites, Walkerton, Ind.

[73] Assignee: American Door Company of Michigan, Inc., Walkerton, Ind.

[21] Appl. No.: 756,757

[22] Filed: Jan. 5, 1977

[51] Int. Cl.² .......................... B32B 3/30; B32B 3/00
[52] U.S. Cl. ............................... 428/168; 106/15 FP; 156/257; 156/276; 156/290; 156/325; 428/172; 428/331; 428/332; 428/454; 428/479; 428/920; 428/921
[58] Field of Search .............. 428/172, 168, 454, 479, 428/920, 921, 331, 332; 156/257, 276, 325, 290, 311; 106/15 FP

[56] References Cited
U.S. PATENT DOCUMENTS

| | | | |
|---|---|---|---|
| 2,532,983 | 12/1950 | Alderson | 428/454 |
| 2,708,643 | 5/1955 | Page et al. | 428/454 |
| 3,616,173 | 10/1971 | Green et al. | 428/331 |

*Primary Examiner*—George F. Lesmes
*Assistant Examiner*—Paul J. Thibodeau

[57] ABSTRACT

A method of producing fire resistant wood products wherein a plurality of thin wood strips, each having a multiplicity of uniformly close spaced surface indentations, are bonded together in a stack by a binder having fine particles of inert non-flammable material mixed therein to produce a laminated wood unit having a multiplicity of close spaced cavities throughout which are filled with a set binder containing non-flammable material.

11 Claims, 6 Drawing Figures

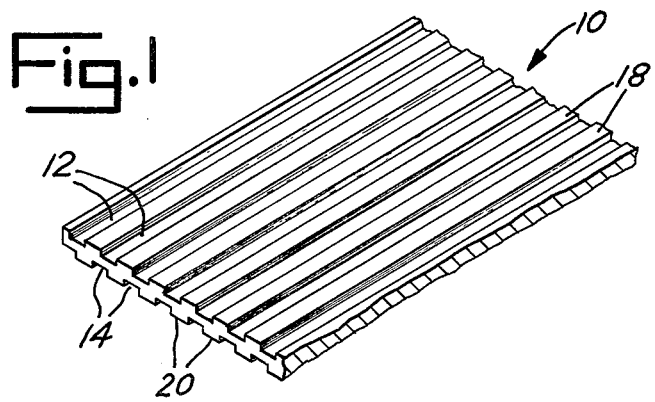
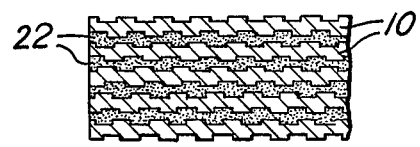
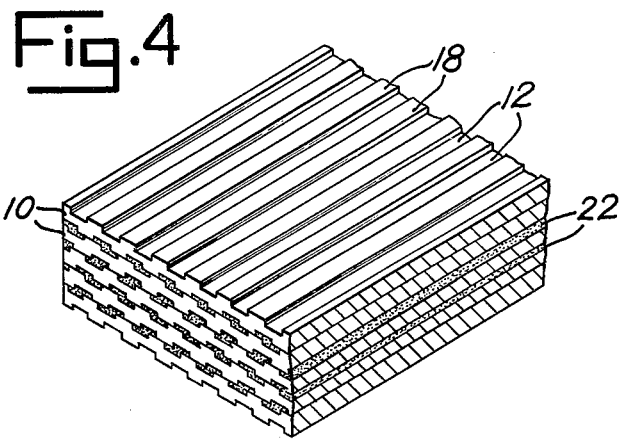
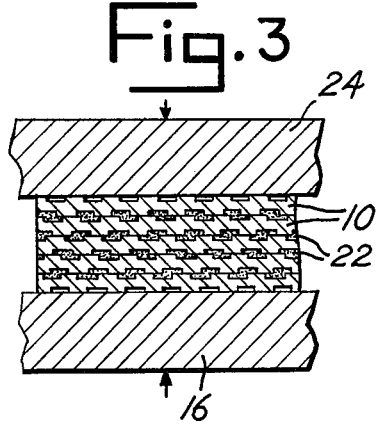
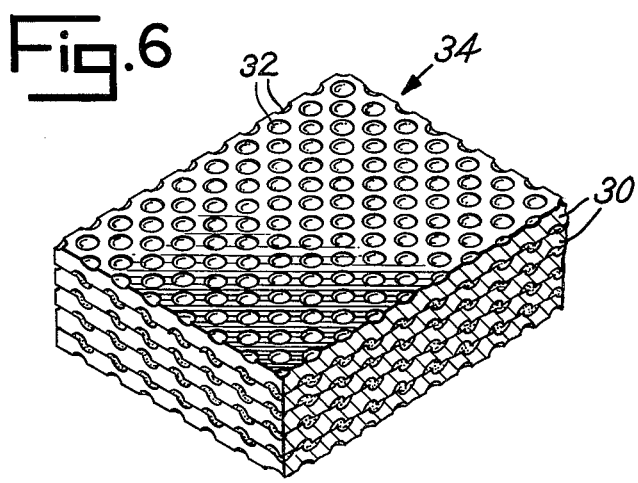
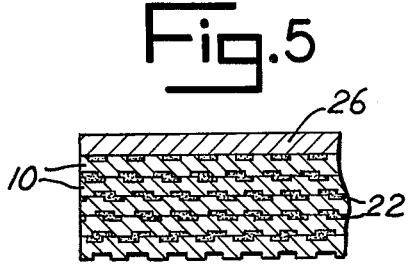

METHOD OF PRODUCING FIRE RESISTANT WOOD PRODUCTS AND PRODUCT THEREOF

SUMMARY OF THE INVENTION

It is frequently desirable for aesthetic and other reasons to produce articles capable of resisting fire from wood rather than metal. Previous methods, such as attempts to inject into wood a fire retardant material, have not met with commercial acceptance. Thus fire resistant doors have heretofore required formation from metal and non-flammable core material; whereas, wooden fire resistant doors would be more attractive.

It is the primary object of this invention to provide a method of producing a fire resistant wood product which is simple and inexpensive.

A further object is to produce a fire resistant wood product from a plurality of laminations having multiple substantially uniformly spaced indentations at one or opposite faces thereof and assembled together and bonded to provide cavities throughout the assembly which are filled with a cement containing an inert or non-flammable filler material, such as clay particles.

A further object is to provide a method of producing a fire resistant product from a plurality of laminations each recessed or indented at opposite faces to provide non-registering spaced ribs at opposite faces, which ribs are cemented to the ribs of the confronting faces of adjacent laminations out of register and the recesses are filled with cement containing an inert filler.

A further object is to provide a method of producing a fire resistant product utilizing wood laminations which are provided with spaced shallow grooves at opposite faces thereof defining linear cavities extending across a product formed of stacked laminations, which linear cavities are filled with a binder containing a flame resistant material.

A further object is to provide a novel inexpensive method of producing a fire resistant wood product.

A further object is to produce a product formed of wood and having substantially the same working characteristics of wood, but capable of retarding ignition or combustion thereof for a substantial period of time.

Other objects will be apparent from the following specification.

In the drawings:

FIG. 1 is a perspective view of a wood lamination used in my process.

FIG. 2 is a cross sectional view illustrating a stack of wood laminations having confronting surfaces of the laminations of the stack adhered by a glue.

FIG. 3 is a cross sectional view illustrating a step of the method in which a stack of laminations are compressed and heated.

FIG. 4 is a perspective view of a product of the process.

FIG. 5 is a cross sectional view illustrating a modification of the laminated wood product having a backing strip applied thereto.

FIG. 6 is a perspective view of a product constituting a modified embodiment of the invention.

DESCRIPTION OF THE PREFERRED EMBODIMENTS

Referring to the drawings which illustrate the product and the steps of the process of producing it, the principal components employed are strips of laminations 10 of wood, preferably a hard wood having a density of not less than 38 lbs. per cubic foot. Each strip or lamination 10 is of relatively thin character, i.e. preferably having a thickness in the range of 1/12 to ⅛ inch, such as a thickness of approximately 1/10 inch. At least one face, and preferably both faces, of each lamination 10 is provided with a plurality of spaced indentations. Thus, as illustrated in FIG. 1, the lamination 10 is provided with a plurality of substantially uniformly spaced shallow grooves 12 and 14 which preferably are of a width from 3/32 to 5/32 inch and are preferably spaced apart a distance from 5/32 to 7/32 inch. The grooves are shallow, being of a depth preferably in the range of 25% to 45% of the total thickness of the lamination, and are preferably substantially parallel and extend completely across each lamination. Where grooves are formed on opposite faces of laminations, such as the grooves 12 and 14 illustrated, said grooves on each lamination or strip are preferably out of register.

The strips or laminations 10 are assembled or stacked in desired number to produce the desired thickness of the finished product, and preferably are arranged as illustrated in FIGS. 2 and 3, whereby a series of close spaced indentations or cavities are formed between confronting or adjacent laminations. Where each lamination is provided with grooves at opposite faces thereof, the laminations preferably are so arranged that the confronting ribs 18 and 20 of adjacent strips or laminations are partly in register with the indentations or grooves in confronting lamination faces also partly in register so as to form or define cavities. Cement or glue is applied to the faces of the strips or laminations which confront other strips or laminations, said glue being shown at 22 in FIG. 2 and being applied in sufficient quantity to ensure filling the grooves or indentations of each lamination, that is, filling all cavities between laminations. When laminations of selected number so coated with glue are assembled or stacked, they are mounted in a suitable press having a bed 16 upon which they can be supported, preferably in horizontal position. The press has an upper platen 24 which can be lowered to apply pressure to the stack and to reduce the thickness of the stack to the thickness of the desired product.

The glue or cement employed is preferably a casein glue or a resorcinol glue, such as a phenol resorcinol glue catalyzed with formaldehyde. The glue contains an inert filler material, such as Lincoln 60 clay of a fineness of approximately 200 microns. The inert clay filler is thoroughly and uniformly mixed in the glue and is preferably used in proportions of 25% to 40% inert material and 60% to 70% glue by weight.

In the event that one or more outer surfaces of the finished product are to be substantially smooth, a backing strip 26 can be applied to the assembled stack at either the top or the bottom face thereof, or at both said faces, the same being coated with glue at the innermost face thereof. The backing strip 26 is preferably formed of hard wood, that is a wood having a density of not less than 38 lbs. per cubic foot, and may be of any selected thickness, and preferably a thickness in the range from 1/10 to ⅜ inch, and is cemented to the laminations of the stack. An example of a product having such a backing strip 26 is shown in FIG. 5.

In producing the product, the strips or laminations 10 are of selected length and width and are assembled in the stack in an arrangement conforming generally to the desired cross sectional shape or configuration of the desired finished product. The strips or laminations 10 are passed through a glue spreader which applies the inert-filled glue described above in sufficient quantity to fill the surface indentations of the laminations. The coated laminations are then assembled or stacked in desired number, and, if used, one or a pair of backing strips 26 are applied to the stack, as at the top or bottom thereof, or at both top and bottom, as mounted upon the bed 16 of the press, it being understood that each backing strip 26 will also have glue applied at the face thereof to be adhered to an adjacent lamination or strip. The stack of laminations or of laminations and backing strip or strips, is then hot pressed by lowering of the upper press platen 24 to a position spaced from the bed 16 of the press, a distance equal to the desired thickness of the finished product. While maintained under such pressure the stack is subjected to a temperature, preferably in the range between 335° and 365° F. for a period of time sufficient to cure the cement. With the type of cement or glue above described, such a curing at a temperature of 350° F. can be accomplished in a period of approximately ten minutes.

A product using an alternative type of wood lamination or strip 30 provided with a plurality of indentations 32 at one face or opposite faces of each lamination is illustrated in FIG. 6. In this embodiment the indentations 32 may be circular or of other shape, and each preferably will have a transverse dimension from 3/32 to 5/32 inch and will preferably be spaced from adjacent indentations a distance from 5/32 to 7/32 inch. The indentations are shallow, being of a depth preferably in the range from 25% to 50% of the total thickness of the lamination. The indentations are formed in the laminations in the above described arrangement throughout the entire surface of the lamination. These indentations 32 in the alternate form of strip or lamination 30 illustrated in FIG. 6 define cavities in which glue or cement containing a clay or other non-flammable or inert filler may be received so as to completely fill the cavities between lamainations which are formed thereby. Where such indentations are formed on opposite faces of the laminations 30, such indentations at opposite faces are preferably out of register and the laminations may be stacked so as to arrange the indentations in the confronting faces of adjacent laminations either wholly in register, partly in register, or out of register.

After the stack of laminations, with or without backing strips, have been compressed and the cement thereof cured, the resulting product can be removed from the press and finished to desired dimensions and characteristics, as by sanding, trimming or otherwise shaping thereof by tools or equipment commonly employed in the woodworking industry. The finished product is resistant to fire for a substantial period of time, such as one hour, when subjected to temperature and conditions at which wood normally ignites rapidly. The fire resistance results from the filling of the multiple cavities occurring throughout the product with the bonding agent containing the clay or other inert filler material which effectively resists combustion. Hence, only exposed surfaces of the thin outer laminations and the edges of laminations are subjected to the burning temperature, and combustion thereof is effectively retarded much longer than the time in which a solid wooden member of the same hardness, dimensions and configuration would ignite. Tests reveal that the product herein described will remain resistant to combustion for a period of at least one hour.

While the glue above described is preferred, other glues with an inert filler may also be used. An illustrative alternate glue is a mixture of sodium silicate, sodium metasilicate, a clay aluminate filler and a surfactant or wetting agent, wherein the components are as follows:

| | |
|---|---|
| sodium silicate (as K grade of Philadelphia Quartz Co.) | 95 lbs. to 105 lbs. |
| sodium metasilicate | 4¼ lbs. to 6 lbs. |
| clay aluminate (as J 58 of Summer Chemical Co.) | 38 lbs. to 42 lbs. |
| surfactant (as BF610 to GAF Co.) | .75 lbs. to .85 lbs. |

While the preferred embodiments of the invention and of the preferred steps of the method have been illustrated and described, it will be understood that changes in the construction and in the steps of the method may be made within the scope of the appended claims without departing from the spirit of the invention.

What I claim is:

1. In a process of making a fire resistant wood product, the steps of
   assembling in stacked relation a plurality of thin strips of hard wood each having a plurality of indentations of a depth of 25% to 50% of the thickness of the strip in at least one face thereof in substantially uniformly and close spaced relation after coating of the surfaces and filling the indentations of each strip which confronts another strip in the stack with a cement in which an inert non-flammable filler material has been substantially uniformly distributed in an amount from 30% to 40% by weight of the total weight of the cement, and
   subjecting said stack of strips to heat and pressure for a period of time sufficient to set said cement and bond the strips of the stack in selected thickness.
2. The method defined in claim 1 wherein
   said strips are formed of wood having a density of at least 38 pounds per cubic foot and a thickness between 1/12 and ⅛ inch.
3. The method defined in claim 1 wherein
   said strips are formed of hard wood having a thickness from 1/12 to ⅛ inch and said indentations are spaced apart from 5/32 to 7/32 inch.
4. The method defined in claim 1 wherein
   said indentations constitute substantially uniformly spaced grooves extending across the strip.
5. The method defined in claim 1, wherein
   said indentations are formed on both faces of strips located within the stack and the strips are arranged in the stack with indentations in the confronting faces of adjacent strips at least partially in register.
6. The method defined in claim 1, wherein
   said cement is of the heat setting type including casein glue, or resorcinol glue such as phenol resorcinol glue catalyzed with formaldehyde, or a mixture of sodium, silicate, sodium metasilicate and a surfactant, and said inert filler material is a clay of a fineness of approximately 200 microns.
7. The method defined in claim 1 wherein
   said cement is of the type which sets in approximately 10 minutes when subjected to a temperature from 335° F. to 360° F.
8. A fire resistant wood product comprising
   a stack of similar thin strips of hard wood each having a plurality of substantially uniformly spaced indentations having a depth of 25% to 50% of the thickness of the strips in at least one face thereof to define spaced interior cavities throughout the stack, the strips of the stack being of a thickness of from 1/12 to ⅛ inch and bonded together by a binding agent which fills all cavities and contains uniformly distributed therein fine particles of inert non-flammable filler material constituting from 30% to 40% of the binding agent by weight.

9. A fire resistant product as defined in claim 8, wherein said indentations are spaced grooves extending across each lamination.

10. A fire resistant product as defined in claim 8, wherein said binding agent is a glue which sets under heat and pressure and said non-flammable material in said glue is a clay having a fineness of approximately 200 microns.

11. A fire resistant product as defined in claim 8, wherein said indentations are of a width of substantially 3/32 inch to 5/32 inch and are spaced apart a distance of substantially 5/32 inch to 7/32 inch.

* * * * *